United States Patent [19]

Gee et al.

[11] 3,998,400
[45] Dec. 21, 1976

[54] QUICK RELEASE HUB

[75] Inventors: Richard W. Gee, Sandy; William Bushly Hammond, Salt Lake City, both of Utah

[73] Assignee: Sperry Rand Corporation, Salt Lake City, Utah

[22] Filed: Mar. 24, 1976

[21] Appl. No.: 669,939

[52] U.S. Cl. .............................................. 242/68.3
[51] Int. Cl.² ......................................... B65H 17/02
[58] Field of Search .................. 242/68.3, 72, 72.1

[56] References Cited
UNITED STATES PATENTS

| | | | |
|---|---|---|---|
| 3,490,716 | 1/1970 | Miller | 242/68.3 |
| 3,544,027 | 12/1970 | Green | 242/68.3 |
| 3,606,188 | 9/1971 | Wagner | 242/68.3 |
| 3,833,181 | 9/1974 | Watkins | 242/68.3 |

*Primary Examiner*—Edward J. McCarthy
*Attorney, Agent, or Firm*—Thomas P. Murphy; Thomas J. Nikolai; Marshall M. Truex

[57] ABSTRACT

A hub for mounting a reel of tape including means facilitating the rapid mounting and release of the reel. The hub comprises internal structure wherein the turn of an actuating handle in one direction causes an O-ring to expand and grip the reel and a turn in the opposite direction permits the O-ring to contract and release the reel.

10 Claims, 4 Drawing Figures

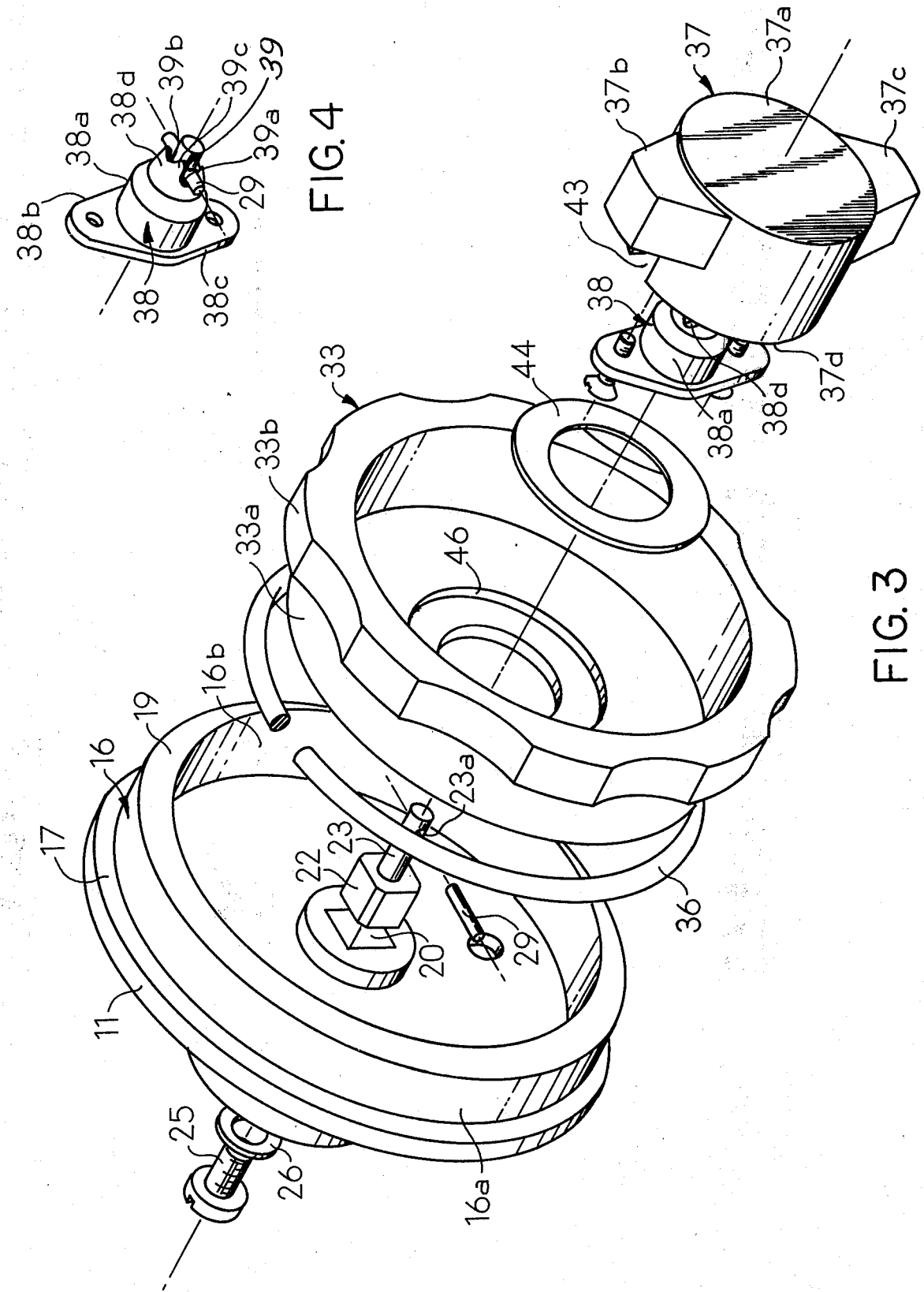

QUICK RELEASE HUB

BACKGROUND OF THE INVENTION

In the computer field, one of the many ways for the storage of data is in the form of magnetic tape. This tape is wound on supply and take-up reels and in a manner well known in the art, fed past a read-write head for reading data into the computer or for writing data from the computer.

In a typical tape-handler arrangement, the supply and take-up reels are mounted on hubs which rotate the reels in the desired manner under the control of an operator. Since tapes have only limited storage capacity, the operator must frequently remove the reels and replace them with others. The speed with which the operator can replace reels on the hub is an important factor in the efficient use of a computer system.

Various hubs for facilitating the rapid replacement of reels are presently in use. However, the structure of these hubs is complex compared to the hub of the present invention.

The present invention contemplates a hub of novel construction which, due to its few parts and simplicity of construction, makes for ease and economy of construction without sacrifice of durability and speed with which the reels may be mounted on and removed from the hub. Due to the simple design and few parts, the hub may be made from plastic material, making it lighter in weight which reduces reel-servo power requirements. In addition the construction of the present invention permits rapid disassembly and assembly for ease of maintenance and repair.

More specifically, the present invention comprises a circular-shaped baseplate and frontplate which fit together to form a circumferential surface about the outer periphery thereof on which a reel may be disposed. The baseplate and frontplate together form an annular V-shaped recess in the circumferential surface in which an O-ring is disposed. When the plates are moved to a first position relative to each other, the width of the V-shaped recess is made smaller to force the O-ring to expand axially beyond the circumferential surface to grip the inside surface of a reel and secure it to the hub. On moving the plates to a second position, the width of the V-shaped recess is made larger, permitting the O-ring to contract below the circumferential surface thereby releasing the hub. The means for moving the plates to the first and second positions comprises a shaft fixed to the backplate and extending therefrom. The frontplate has a handle having an opening in its center in which a two-position cam arrangement is disposed. The shaft extends into the cam arrangement and has a rod extending through it in the transverse direction for cooperation with the cam arrangement. When the handle is turned in a first direction, the rod is forced into one cam position moving the plates together to the first position. When the handle is turned in a second direction, the plates are moved away from each other to the second position. The baseplate has means for adjusting the length of the shaft for varying the gripping force of the hub.

OBJECTS OF THE INVENTION

It is an object of the present invention to provide a hub on which a magnetic-tape reel may be easily and quickly mounted and removed.

Another object of the present invention is to provide a reel-mounting hub which is simply constructed using a minimum of parts to permit ease and economy of construction.

A further object of the present invention is to provide a quick-release, reel-mounting hub which is easily assembled and disassembled and whose reel-gripping force is easily adjustable.

Yet another object of the present invention is to provide a light-weight, reel-mounting hub which is composed of few and simple parts which permit fast and low-cost manufacture without sacrifice of durability and speed of reel mounting and dismounting.

Other objects and many of the attendant advantages of the present invention will become more apparent upon reading the following description in conjunction with the drawing.

DESCRIPTION OF THE DRAWING

FIG. 3 is a perspective-exploded, assembly view of the hub of the present invention; and FIG. 4 is an isometric view of the cam arrangement of the present invention.

DESCRIPTION OF THE INVENTION

Figure 1:
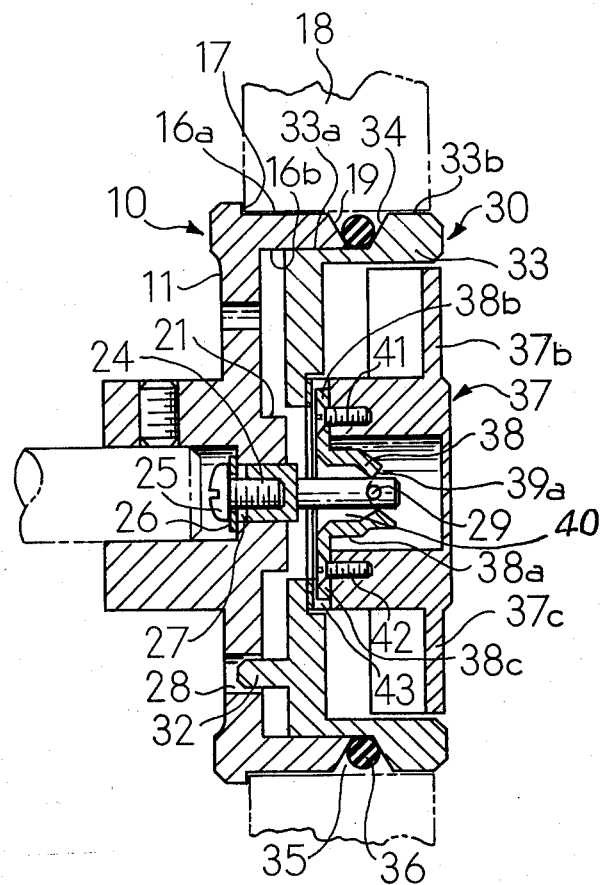
FIG. 1 is a side sectional view showing the hub of the present invention in the reel-release position.

Referring now more particularly to FIG. 1, there is shown the reel-mounting hub 10 of the present invention. The hub 10 comprises a baseplate 11. Integrally formed with the baseplate 11 is a shaft mount comprising a protrusion 12 having an opening 13 for receiving the end of a tape-transport drive shaft 14. The drive shaft is secured in position, e.g., by one or more set screws 15, only one of which is shown.

Also formed integrally with baseplate 11 is an annular extension 16 which forms a circumferential surface 16a around its outer periphery.

Extension 16 and circumferential surface 16a are best seen in FIG. 3.

Baseplate 11 has formed thereon a lip 17 which extends slightly above the circumferential surface 16a. The lip 17 serves as a limit stop for a magnetic-tape reel shown in phantom as element 18.

The end 19 of extension 16 is cutaway or beveled to form an obtuse angle with the circumferential surface 16a as shown.

The baseplate 11 also has formed therein an opening 20 which extends through the baseplate 11 which is a continuation of the opening 13.

The opening 20 passes through a circular protrusion 21 also integrally formed in the baseplate 11.

As best seen in FIG. 3, opening 20 is substantially square-shaped.

A block-shaped element 22 as best seen in FIG. 3 having a shaft 23 formed integrally therewith and extending therefrom is snugly disposed in opening 20.

The block-shaped element 22 has an internally-threaded opening 24 for receiving a screw 25. The screw 25 and washer 26 serve to rigidly secure element 22 within opening 20. It should be noted that rotational movement of the element 22 within opening 20 is prevented by the square shape of both elements.

A space 27 in opening 20 permits the distance which the shaft 23 extends from baseplate 11 to be adjusted by the simple use of a screwdriver.

The baseplate 11 also has holes 28 and 28a formed therein.

The shaft 23 has an opening 23a as shown in FIG. 3 for receiving a rod 29 at a point during final assembly of the hub 10. The rod 29 is secured against movement in the shaft 23 as by force fitting and extends equally on both sides of the shaft 23.

Figure 2:
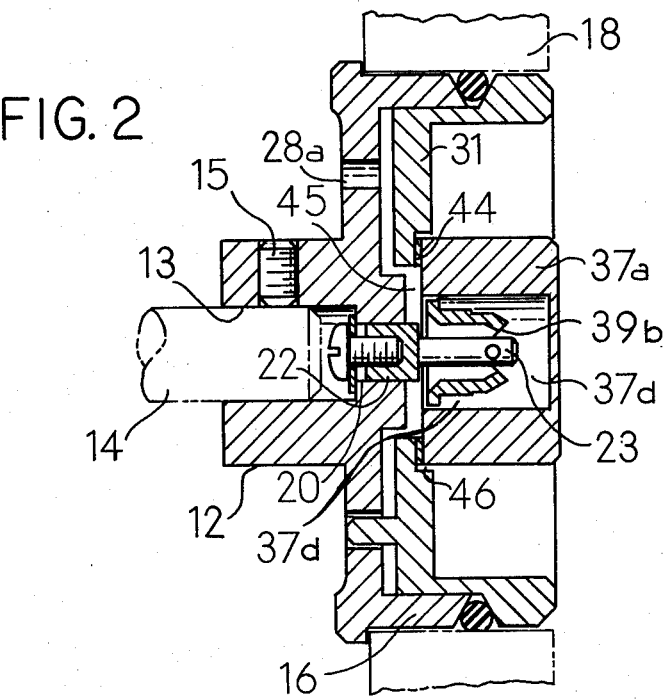
FIG. 2 is a side sectional view showing the hub of the present invention in the reel-securing position.

The hub 10 further comprises a circular plate 30 hereinafter referred to as frontplate 30. The frontplate 30 comprises a wall portion 31 which has a protrusion 32 formed thereon which, as shown in FIGS. 1 and 2, extends into a hole 28. The purpose of hole 28 and protrusion 32 is to assure alignment of frontplate 30 within baseplate 11 during assembly. Hole 28 also insures that frontplate 30 and baseplate 11 rotate as a unit when driven by the servo motor. Otherwise, the tape reel tends to slip more easily. Hole 28a has the purpose of releasing trapped air since O-ring 36 makes an airtight seal and air must be quickly released when the hub is actuated to the locked position.

The frontplate 30 has an extension 33 formed integrally therewith. The extension 33 comprises a first circumferential surface 33a having an outer diameter such that it fits within the inner diameter of extension 16 so that it is in sliding relationship with the inner surface 16b of extension 16. Extension 33 has a second circumferential surface 33b which, along with circumferential surface 16a forms the mounting surface for the reel 18. Circumferential surfaces 16a and 33b lie in substantially the same plane. However, surface 33b may have a slightly less diameter than surface 16a to permit the reel to be easily mounted on the hub. A surface or end 34 forms an obtuse angle with the circumferential surface 33b.

The ends 34 and 19 together form a V-shaped annular groove 35 around the hub 10.

An O-ring 36 made of hard rubber or other suitable flexible material is disposed within the groove 35 and rests substantially on the circumferential surface 33a when in the contracted position as shown in FIG. 1. In this position the O-ring 36 is below both circumferential surfaces 16a and 33b permitting the reel 18 to be easily moved on and off of the hub 10.

However, when baseplate 11 and frontplate 33 are in the position shown in FIG. 2, the O-ring 36 rests on the ends 19 and 34 since they are closer together than shown in FIG. 1 and have narrowed the width of the groove 35. In this position, the O-ring 36 has been forcibly expanded and extends beyond the circumferential surfaces 33b and 16a. Thus, in this position, the reel is securely gripped by the O-ring 36 on the hub 10.

The structure by which the frontplate 33 is moved relative to the baseplate 11, i.e., from the position shown in FIG. 1 to the position shown in FIG. 2 and vice versa is described hereinbelow.

A handle 37 comprises a circular portion 37a and extensions 37b and 37c. The extensions 37b and 37c are used by an operator to turn the handle to the required positions for locking and releasing a reel from the hub. The surface 33b may be scalloped as shown in FIG. 3 to provide a thumb and finger grip while the handle is actuated by the other hand of an operator.

The circular portion 37a has an opening 37d for receiving a cam structure 38. The cam structure 38 which is made of metal, e.g., silicon bronze, comprises cylindrical portion 38a, flange portions 38b and 38c which extend from the base of cylindrical portion 38a and cam portion 38d, all integrally formed. The cam portion 38d is conical in shape and is a two-position cam terminating in cam surface 39.

There is an opening 40 through the cam structure 38 for receiving the shaft 23 whose end extends beyond the cam surface 39 so that rod 29 rests on the cam surface.

As best seen in FIG. 4, cam surface 39 has two sets of indentations or notches 39a and 39b separated by two protrusions or stops 39c. Indentations 39a which are opposite each other on the cam surface 39 are deeper than indentations 39b. Rod 29 rests in indentations 39a when the hub 10 is in the released position. Indentations 39b are opposite each other on the cam surface 39 and have a depth less than those of indentations 39a. Rod 29 rests in indentations 39b when the hub is in the reel-securing position. Stops 39c are opposite each other on cam surface 39 and prevent further movement of rod 29 when the hub is in the released or reel-securing position.

As can be seen in FIG. 4, the cam surface 39 between indentations 39a and 39b permits rod 29 to slide thereon as it is changing positions. One of the indentations 39a is seen in FIG. 1 as line 39a, and one of the indentations 39b is seen in FIG. 2 as line 39b.

The cam structure 38 is bolted to the circular portion 37a of handle 37 by means of screws 41 and 42 which pass through flanges 38b and 38c, respectively. A recess 43 seen in FIG. 1 and partially in FIG. 3 is adapted to receive flanges 38b and 38c so that they are flush with the inner end 37d of circular portion 37a and do not interfere with the turning of handle 37.

In final assembly the handle 37 including the cam structure 38 fits entirely within the recess formed by extension 33 of frontplate 30 for both the locked and the unlocked conditions. This lack of extension beyond the main hub surface reduces hazard to the operator.

Also in final assembly, the end 37d of the circular portion 37a of handle 37 rests on a washer 44 which sits in an annular recess 46 formed about circular opening 45 in wall 31 of the frontplate 30. The purpose of washer 44 is to provide a low-friction wear surface between the end 37d of handle 37 and the annular recess 46 of frontplate 30.

The whole hub assembly is secured together by means of screw 25 and rod 29 which rests on cam surface 39. As aforesaid, the screw 25 may be turned to lengthen or shorten the distance that shaft 23 extends into opening 37d of the handle to permit variation of the gripping force of the hub 10.

When the hub 10 is in the released or unlocked condition, a reel may be easily removed from or positioned on the hub 10. When it is desired to put a reel on the hub 10 for use, it is placed about circumferential surfaces 16a and 33b until it is stopped by lip 17. The handle is then turned a quarter turn or 90° in a first direction, e.g., the clockwise direction. This causes rod 29 to change from indentations 39a to indentations 39b of cam surface 39, causing the frontplate 30 to move to a closer position relative to baseplate 11. As seen in FIG. 2, this causes the groove 35 to become smaller and forces O-ring 36 to expand and extend beyond the circumferential surfaces 16a and 33b and grip the reel, such as reel 18. When the tape-transport power is turned on, the reel rotates with the hub 10.

When it is desired to release a reel from the hub 10, the handle is turned in the opposite direction, i.e., counterclockwise a quarter turn or 90°. This causes rod 29 to move from indentations 39b to indentations 39a, which causes the frontplate 30 to move away from baseplate 11 to the position shown in FIG. 1. As seen in FIG. 1, the groove 35 formed by the ends 19 and 34 becomes bigger. This permits the O-ring 36 to contract naturally and rest on circumferential surface 33a. In this position, the O-ring 36 is below circumferential surfaces 16a and 33b and, therefore, no longer exerts a gripping force on the reel which is released and easily removed from the hub 10.

While not shown, the handle 37 is marked indicating direction for lock and release. This permits the operator to always know when the reel is locked or unlocked from the hub 10. Stops 39c are an integral part of cam structure 38 to prevent the handle from being turned further in the same direction after it is locked and further in the same direction after it is unlocked.

All the parts of the present invention excluding screws and the cam structure may be made of injection-molded plastic material such as a glass-fortified styrene copolymer.

Other modifications of the present invention are possible in light of the above disclosure which should not be limited other than by the claims which follow.

What is claimed is:

1. A hub for mounting a reel, comprising in combination;
    a first circular plate having an extension about its outer periphery forming a first circumferential surface,
    a second circular plate disposed relative to said first plate having an extension about its outer periphery forming second and third circumferential surfaces,
    said first and third circumferential surfaces being in substantially the same plane and having first means forming with said second circumferential surface a V-shaped groove having a width which varies when the relative position of said first and second plates vary,
    an expandable O-ring disposed within said V-shaped groove remaining below said first and third circumferential surfaces when said first and second plates are in a first relative position and extending beyond said first and second circumferential surfaces when said first and second plates are in a second relative position,
    second means connected to said first and second plates for moving said first and second plates to said first and second relative positions.

2. A hub according to claim 1 wherein said first means comprises;
    the end of said extension of said first plate and the portion of said extension of said second plate extending between said second and third circumferential surfaces.

3. A hub according to claim 2 wherein said end and said portion of said extensions form the sides of said V-shaped groove with said second circumferential surface forming the base thereof.

4. A hub according to claim 3 wherein said end forming one side of said groove makes an obtuse angle with said first circumferential surface and said portion forming the other side of said groove makes an obtuse angle with said third circumferential surface to form said V-shaped groove.

5. A hub according to claim 4 wherein said O-ring rests substantially on said second circumferential surface when said first and second plates are in said first relative position and is expanded to rest on said sides of said V-shaped groove when said first and second plates are in said second relative position.

6. A hub according to claim 5 wherein;
    the portion of said extension of said second plate which forms said second circumferential surface is telescoped in sliding relationship within said extension of said first plate.

7. A hub according to claim 6 wherein; said first and third circumferential surfaces have substantially the same circumference and form the surface of the hub for mounting a reel.

8. A hub according to claim 7 wherein said second means comprises;
    a recess formed by said extension of said second plate,
    handle means disposed entirely within said recess,
    a cam arrangement means secured within said handle means,
    shaft means connected to said first plate and extending into said handle means for cooperation with said cam arrangement whereby when said handle means is turned to a first position said first and second plates assume said first relative position and when said handle means is turned to a second position and first and second plates assume said second relative position.

9. A hub according to claim 8 wherein said cam arrangement means comprises;
    a cylindrical element having an opening,
    said element having a cam surface at an end furthest away from said second plate,
    said cam surface including first and second opposing pairs of detents, each of said pairs of detents having a surface extending different distances from said second plate,
    said shaft means comprising a shaft extending through said opening in said cylindrical element, and
    a rod secured transversely through an end of said shaft disposed in sliding relationship against said cam surface whereby said first and second plates are secured together and are in said first relative position when said rod is disposed within said first pair of detents and are in said second relative position when said rod is disposed in said second pair of detents.

10. A hub according to claim 9 wherein said shaft includes adjustment means for varying the length it extends through said cylindrical means whereby the amount said O-ring extends beyond said first and third circumferential surfaces may be varied to change the gripping force which secures the reel to the hub.

* * * * *

UNITED STATES PATENT AND TRADEMARK OFFICE
CERTIFICATE OF CORRECTION

PATENT NO. : 3,998,400
DATED : December 21, 1976
INVENTOR(S) : Richard W. Gee; William Bushly Hammond It is certified that error appears in the above-identified patent and that said Letters Patent are hereby corrected as shown below:

IN THE PRINTED PATENT

Column 6, Line 33, "and" (first occurrence) should be -- said --.

Signed and Sealed this

Fifth Day of April 1977

[SEAL]

Attest:

RUTH C. MASON
Attesting Officer

C. MARSHALL DANN
Commissioner of Patents and Trademarks